United States Patent
Hiron et al.

(10) Patent No.: US 7,520,321 B2
(45) Date of Patent: Apr. 21, 2009

(54) REDUNDANT SYSTEMS FOR DOWNHOLE PERMANENT INSTALLATIONS

(75) Inventors: Stéphane Hiron, Rosharon, TX (US); Yves Mathieu, Clamart Cedex (FR); Christian Chouzenoux, Clamart Cedex (FR); Patrick Gourdonneau, Clamart Cedex (FR); Nicolas Renoux, Clamart Cedex (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 83 days.

(21) Appl. No.: 10/554,362

(22) PCT Filed: Apr. 9, 2004

(86) PCT No.: PCT/EP2004/003993
§ 371 (c)(1),
(2), (4) Date: Aug. 22, 2006

(87) PCT Pub. No.: WO2004/097174
PCT Pub. Date: Nov. 11, 2004

(65) Prior Publication Data
US 2007/0007001 A1    Jan. 11, 2007

(30) Foreign Application Priority Data
Apr. 28, 2003    (GB) ................... 0309590.8

(51) Int. Cl.
*E21B 29/02*    (2006.01)
(52) U.S. Cl. ..................................... 166/65.1
(58) Field of Classification Search .............. 166/65.1, 166/66, 113
See application file for complete search history.

(56) References Cited

U.S. PATENT DOCUMENTS

| 6,615,916 B1* | 9/2003 | Vachon .................. 166/250.01 |
| 2005/0029476 A1* | 2/2005 | Biester et al. ................. 251/58 |

FOREIGN PATENT DOCUMENTS

GB    2401295 A   *  11/2004

* cited by examiner

Primary Examiner—William P Neuder
(74) Attorney, Agent, or Firm—Darla P. Fonseca; Jaime Castano; Dale Gaudier (57) ABSTRACT

A well instrumentation system, comprising: a power and data supply; and a plurality of functional units attached to the power and data supply and distributed throughout the well, characterised in that the power and data supply comprises first and second substantially identical cables, and in that each unit comprises a first power supply channel and a first data channel connected to the first cable, a second power supply channel and a second data channel connected to the second cable, and a functional module which draws power from the first power supply channel or the second power channel module, and data from the first data channel or the second data channel. The power and data supply can comprise a surface unit that can be selectably connected to either the first or second cable. The selection of connection of the surface unit to one or other cable is effective to select the corresponding power and data channels in the functional units.

27 Claims, 13 Drawing Sheets

REDUNDANT SYSTEMS FOR DOWNHOLE PERMANENT INSTALLATIONS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present invention relates to power and data systems for use in permanent installations in wells such as oil and gas wells. In particular, the invention provides such systems which incorporate redundancy in order to improve overall system reliability.

2. Description of Related Art

It has been known for some time to install permanent monitoring devices and valves in wells such as oil and gas wells in order to monitor and control the operation of the well over its lifetime. Such installations require the provision of power and data communication systems for each device. One such system is the WellNet power distribution and communication system of Schlumberger, which is described in more detail in U.S. Pat. No. 6,369,718.

Figure 1:
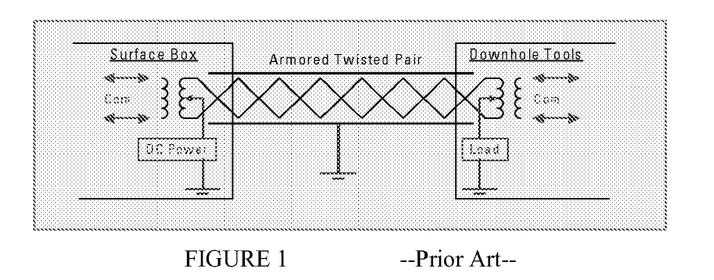
FIG. 1 shows a schematic diagram of a prior art power and data system.

WellNet uses an armored twisted pair cable to transport both communication and power. In this configuration, shown schematically in FIG. 1, power is sent in common mode, often referred to as the "phantom wire", and communication is sent in differential mode, on the twisted wires.

Figure 2:
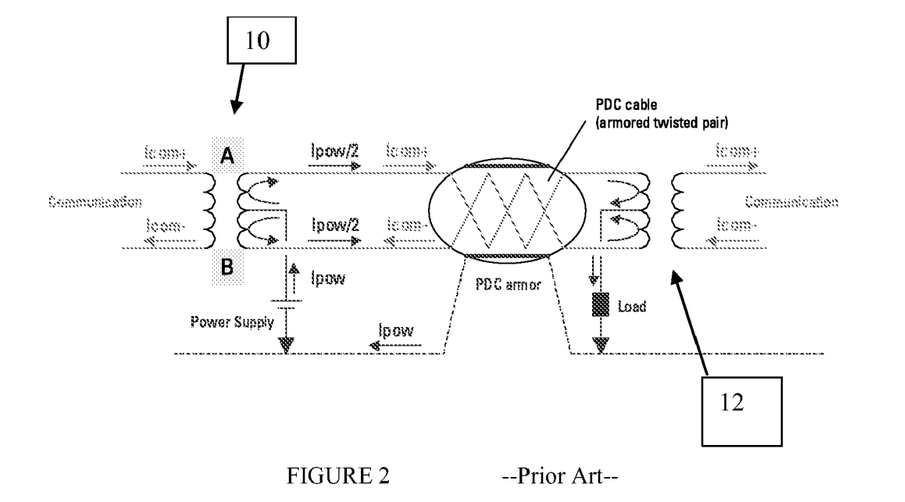
FIG. 2 shows a schematic diagram of the principle of operation of the system of FIG. 1.

FIG. 2 shows a simplified representation of the theoretical principle. The current "Icom" goes from A to B in the primary winding of the surface transformer of the transmitter. The secondary of this transformer sends the modulation in the cable through one wire of the twisted pair with return on the other wire. The signal is picked by the primary of the downhole device transformer, down the cable. The cable armor is never involved in the communication path. Power "Ipow" is sent to the centre tap of the secondary of the transmitter transformer. The current "Ipow/2" flows in the same direction through each wire of the twisted pair. It goes out at the centre tap of the primary of the receiver transformer, enters the power converter of the downhole tool "Load", and returns through the cable armor. The power supply uses both wires of the twisted pair in parallel, allowing large power transfer capabilities, even when using small wires.

Figure 3:
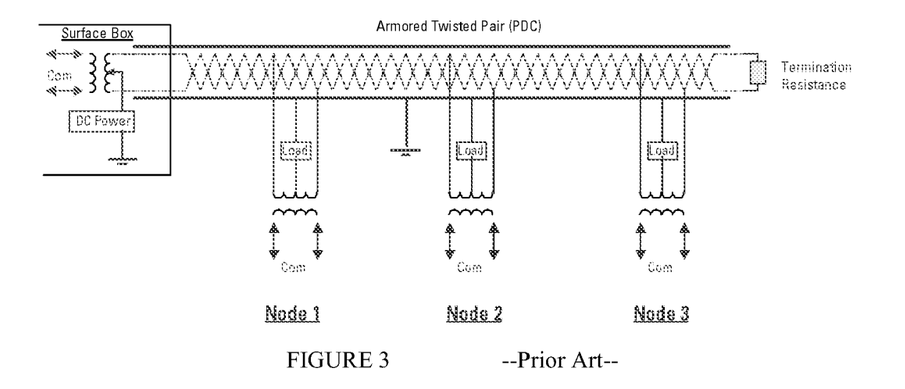
FIG. 3 shows a schematic diagram of a multi-tool installation using the system of FIG. 1.

FIG. 3 shows the manner in which the WellNet system is applied to multiple tools connected on the same cable. Each tool (Node) intercepts the twisted wires to the power and data in the manner described above. A termination resistance is located in the lower cable head of the lowermost device in the string to avoid signal reflections. In order to communicate between the surface controller and the downhole tools, a communication protocol is implemented, each node being addressable independently via the network. Each mode will include one or more electronics modules (WellNet modules) with appropriate firmware to manage this activity.

The system described above has a single cable. Therefore, damage to the cable can mean that the whole installation can become inoperative. One way to avoid this possibility is described in WO 00/46616, which shows a loop configuration for the cable. In this case, instead of terminating the cable at its lower end, the cable is returned to the surface of the well and is connectable to another power and data system. Each node can be provided with power and data from either surface supply, and each node is provided with switches to allow this to be selected. In the event of a problem on the cable, typically detected by the loss of signal, the switches at each node are operated until the location of the fault is identified. Following this, the switches on the nodes above the fault are set to take power and data from the original supply, and those of the nodes below the fault to take power and data from the second supply. Thus the effect of the fault can be limited to one or two devices rather than affecting the whole installation. However, this system requires that the cable run to the bottom of the well, and back to the surface, and that two supplies be provided.

It is an object of the present invention to provide a power and data system which does not require a looped cable in order to operate in the event of faults.

BRIEF SUMMARY OF THE INVENTION

In accordance with the present invention, there is provided a well instrumentation system, comprising: a power and data supply; and a plurality of functional units attached to the power and data supply and distributed throughout the well, characterised in that the power and data supply comprises first and second substantially identical cables, and in that each unit comprises a first power supply channel and a first data channel connected to the first cable, a second power supply channel and a second data channel connected to the second cable, and a functional module which draws power from the first power supply channel or the second power channel module, and data from the first data channel or the second data channel.

Preferably, the power and data supply comprises a surface unit that can be selectably connected to either the first or second cable. The selection of connection of the surface unit to one or other cable is effective to select the corresponding power and data channels in the functional units.

The present invention also comprises a functional unit for installation in a well, comprising a first power supply channel and a first data channel connectable to a first cable in the well, a second power supply channel and a second data channel connectable to a second cable in the well, and a functional module which draws power from the first power supply channel or the second power supply channel, and data from the first data channel or the second data channel.

Preferably, each functional unit is connected to the first and second cable via separate, isolated connectors, one on each cable. The functional units are functionally connected to the cables via respective input transformers. Each power channel is taken from the centre tap of the primary winding of the corresponding input transformer, and each data channel is taken from the secondary winding of the corresponding input transformer.

The outputs of the power channels are typically combined to provide a single power input for the functional module.

Diodes can be provided in each channel to prevent power from an active channel affecting an inactive channel. A fuse can also be included in each channel to allow permanent disabling of a channel in the case of a fault.

Where an intermediate transformer is provided between the power and data channels and the functional module, the single power input can be provided to a tap in the secondary winding of the intermediate transformer.

The power channels can be configured to provide multiple power signals. In such cases, the channels can comprise DC/AC converters and step-down transformers with multiple outputs.

Each data channel is typically taken from the secondary winding of the corresponding input transformer. In one arrangement, the secondary windings of the input transformers are connected to each other. In such a case, the data channel is taken from a common connection to the connection between the secondary windings. It is preferred to provide resistors in the common connection at each transformer to provide an impedance barrier such that one channel does not affect the behaviour of the other channel due to the common connection, which will typically be taken between the resistors.

The data channels can contain transmitter/receiver electronics modules to allow two-way data communication.

One particularly preferred form of the invention uses only passive components in the data and power channels.

An alternative form of the functional unit includes switch devices in each channel, each switch device including one or more active components.

The functional module can include power regulator and controllers for the, or each, power input, and data communication modules, preferably with transmit and receive functionality.

The functional module will typically include sensor and/or actuator functions. One such module is a flow control valve, although other functions such as pressure or flow sensors can also be included according to requirements. Each functional module can also include its own power channel to allow direct connection to a single cable for power and data.

The outputs of the data channels are preferably combined to provide a single data input for the functional module. Where an intermediate transformer is provided, the single data input can be provided to the primary winding of the transformer.

BRIEF DESCRIPTION OF THE SEVERAL VIEWS OF THE DRAWINGS

Examples of embodiments of the present invention are described below with reference to the accompanying drawings, in which.

DETAILED DESCRIPTION OF THE INVENTION

Figure 4:
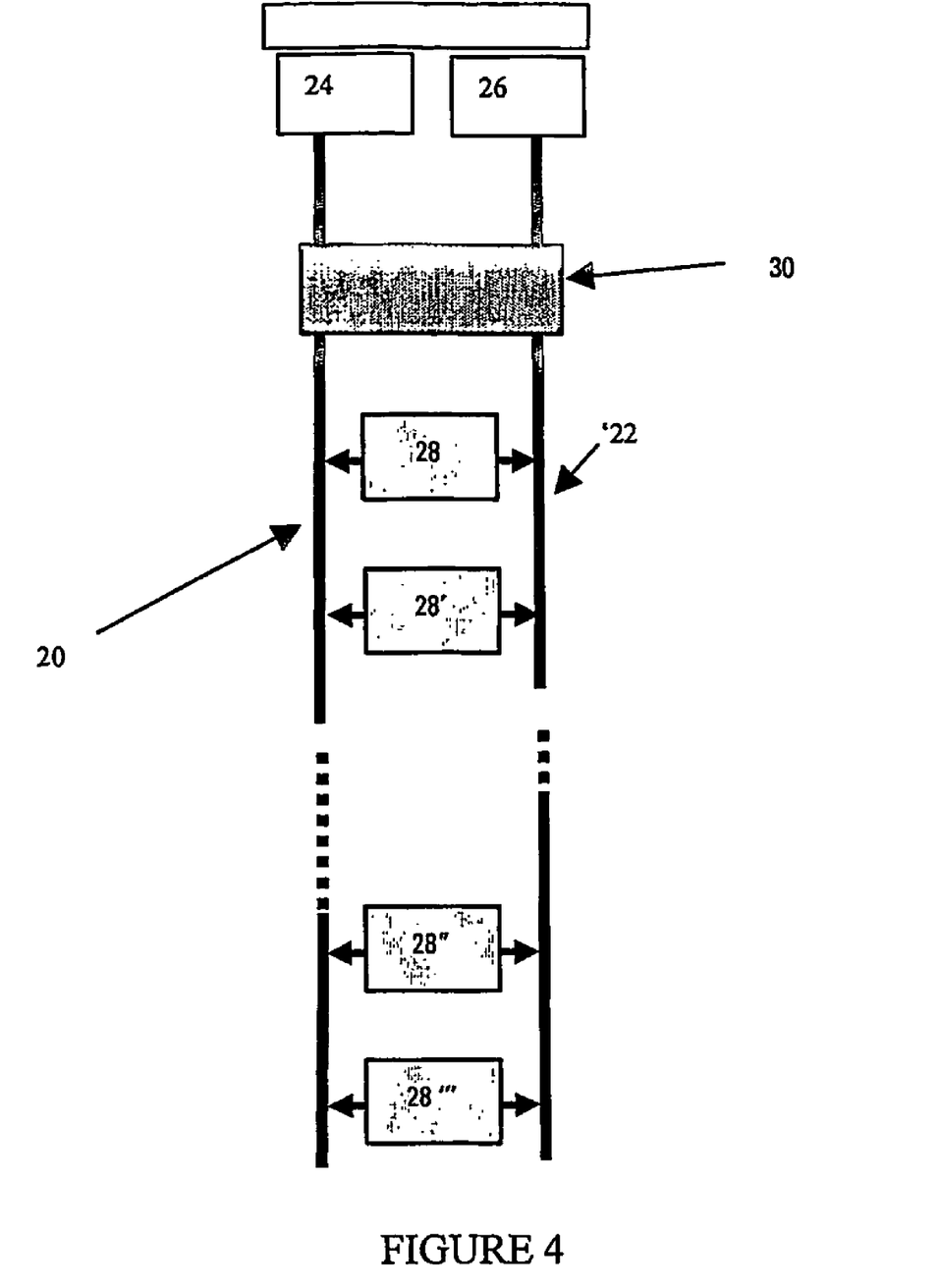
FIG. 4 shows a general view of an installation incorporating the present invention.

The proposed redundancy technique is shown schematically in FIG. 4 and comprises deployment of two power and data cables 20, 22, each connected to a power and data channel 24, 26 at the surface (which may be the sea bed in an offshore installation) with an or-wired condition. This ensures redundancy for the top channel. Only one cable is used at a time and ensures links to all downhole equipment 28, 28', 28", etc. In case of fault condition of this primary cable 20, switching on the secondary cable 22 allows reconnection of all equipment 28. This ensures redundancy for the downhole equipment. The structure comprises two interface cards 24, 26 at surface/subsea level, one for each cable 20, 22, and two cable penetrators at the tubing head 30 to allow connection to the two cables 20, 22 installed in the well. All the downhole tools 28 are connected to the two cables 20, 22 for power and communication and can be accessed via either cable. Should a tool 28 or a cable 20, fail, switching on the alternate cable 22 will give access to the tool chain. Each downhole tool 28 is equipped with a separate sub that allows enabling the power supply and the communication link on the proper cable. In case of cable default, the sub automatically recovers the power supply and ensures the communication link via the secondary cable.

Figure 5:
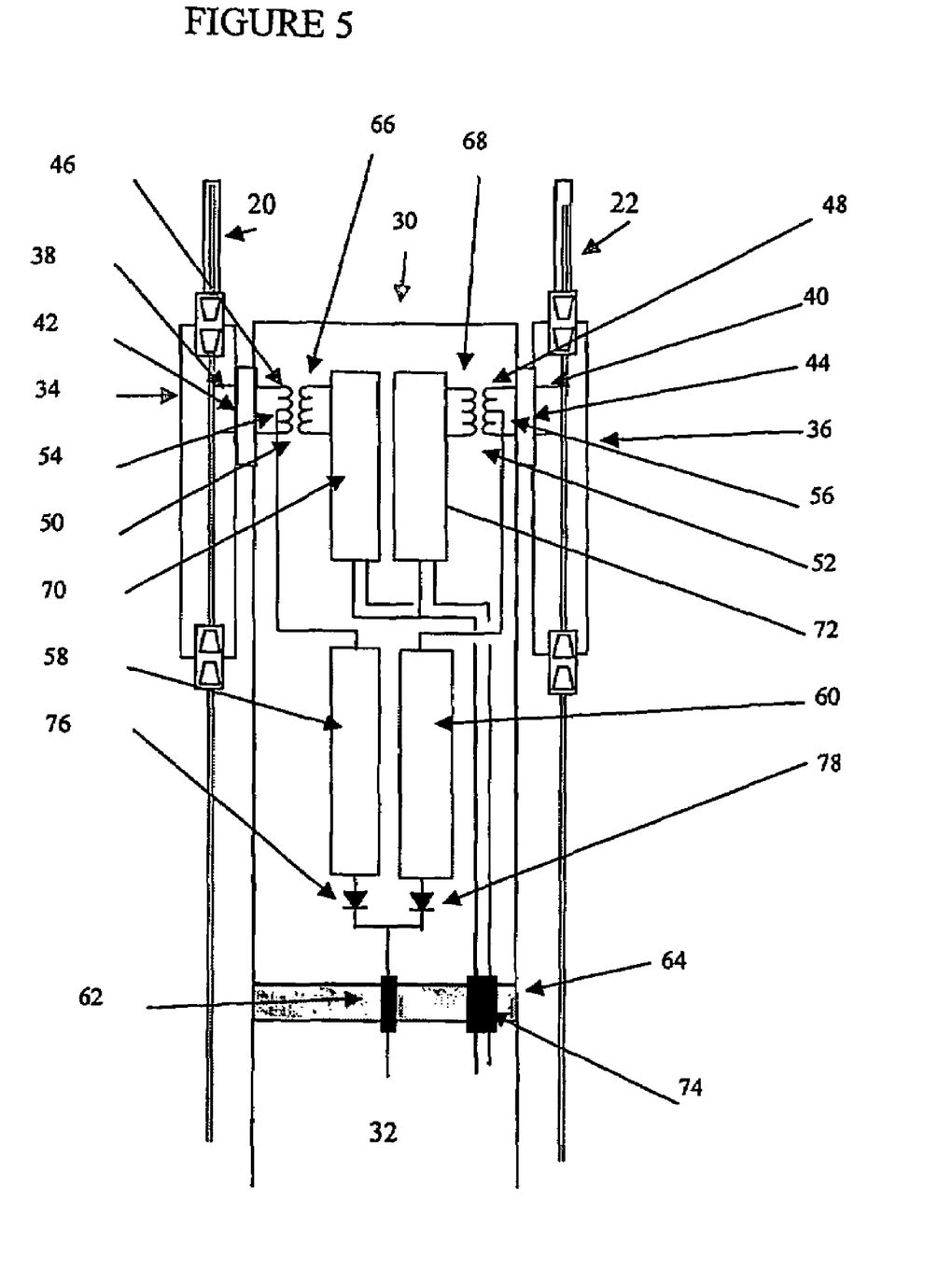
FIG. 5 shows one example of a sub falling within the scope of the present invention for use in the installation of FIG. 4.

FIG. 5 shows one example of a redundancy sub falling within the scope of the invention. The sub 30 is positioned between the downhole tool 32 and the cables 20, 22. Each cable 20, 22 is provided with a separate connection box 34, 36 at the level of the sub 30. The connection boxes 34, 36 are separated and separately insulated, such that failure caused by entrance of fluid into one box has no effect on the other. Connection wires 38, 40 pass from each connection box 34, 36 into the sub 30 via bulkhead connectors 42, 44 having pressure integrity at the pressures encountered in the borehole. The connection wires 38, 40 from each cable 20, 22 are connected to the primary winding 46, 48 of a respective transformer 50, 52 located in the sub 30. A centre tap 54, 56 is taken from each primary winding 46, 48 to corresponding DC power supply circuitry 58, 60 which provides power at the appropriate level for the tool in question via a common power connection 62 which passes to the tool 32 from the sub 30 via a suitable bulkhead connector 64. The secondary winding 66, 68 of each transformer 50, 52 is connected to a respective modem 70, 72 which outputs data signals which pass to the tool 32 via another bulkhead connector 74.

In use, power and data signals are typically provided on one cable (e.g. cable 20), the other cable 22 carrying no signals whatsoever. In the sub 30, the power signals pass through the power supply circuitry 58 to the tool 32. Since the output of both sets of power supply circuitry 58 and 60 are combined before the power signal passes through the bulkhead connector 62 to the tool 32, suitable protection (diodes 76, 78) is provided to prevent the live power channel powering up the dormant one. The data signals are demodulated in modem 70 and passed to the tool 32. Since cable 22 is dormant, no data passes via modem 72. Each tool in the installation will operate in this manner.

In the event of a failure on cable 20, power and data signals on that cable are halted and the signals are passed on cable 22. Consequently, power is passed to the tool via power supply circuit 60 and data via modem 72. Again, all of the tools in the installation behave in this manner. The selection of which modem and power supply circuit is used is effected by the selection of the live cable, there being no active switching in the sub 30. Also, the change in power and data supply is invisible to the tool since the power and signal arrive at the tool along common paths 62, 74 irrespective of which cable is used.

Figure 6:
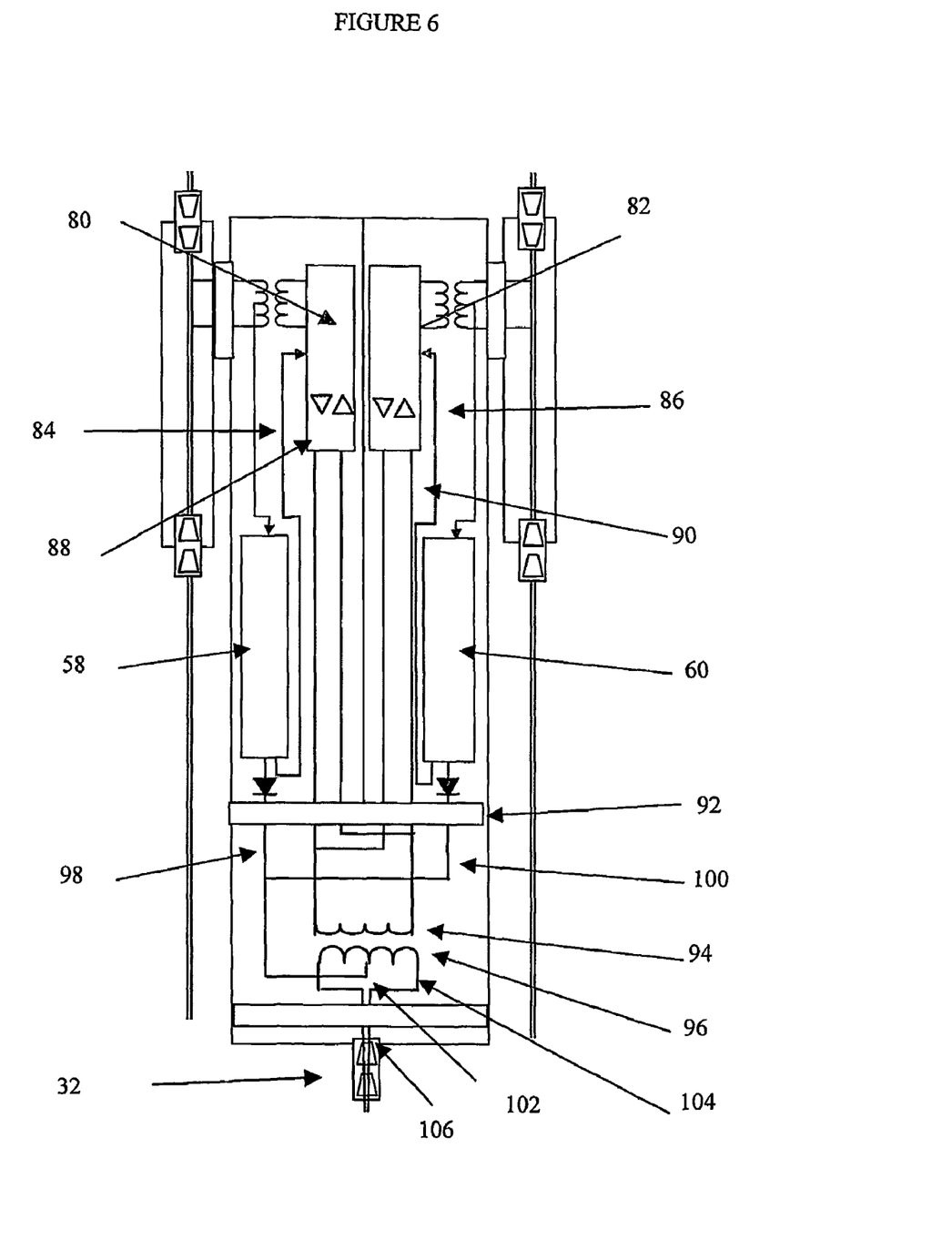
FIG. 6 shows an alternative form of sub to that shown in FIG. 5.

FIG. 6 shown an alternative form of sub to that shown in FIG. 5. In this case, the modems 70, 72 are replaced by amplifiers 80, 82 which also receive power signals 84, 86 from the power supply circuits 58, 60. The output 88, 90 from an amplifier 80, 82 passes through a first bulkhead 92 to the primary winding 94 of an intermediate transformer 96. The power signals 98, 100 pass through the first bulkhead 92 to a tap 102 on the secondary winding 104 and the output 106 from the intermediate transformer 96, comprising both power and data signals, passes through a second bulkhead 108 to the tool 32. The combined signal passed to the tool is separated into its respective data and power components in the normal manner for downhole tools. In this case, the tool 32 sees a power and data signal that is essentially the same as that as might appear from a single cable connection in a normal installation. Again, the selection of power and data channels associated with a particular cable is achieved by switching the supplies to the cable at the surface and it is irrelevant to the tool which channel is active.

Figure 7:
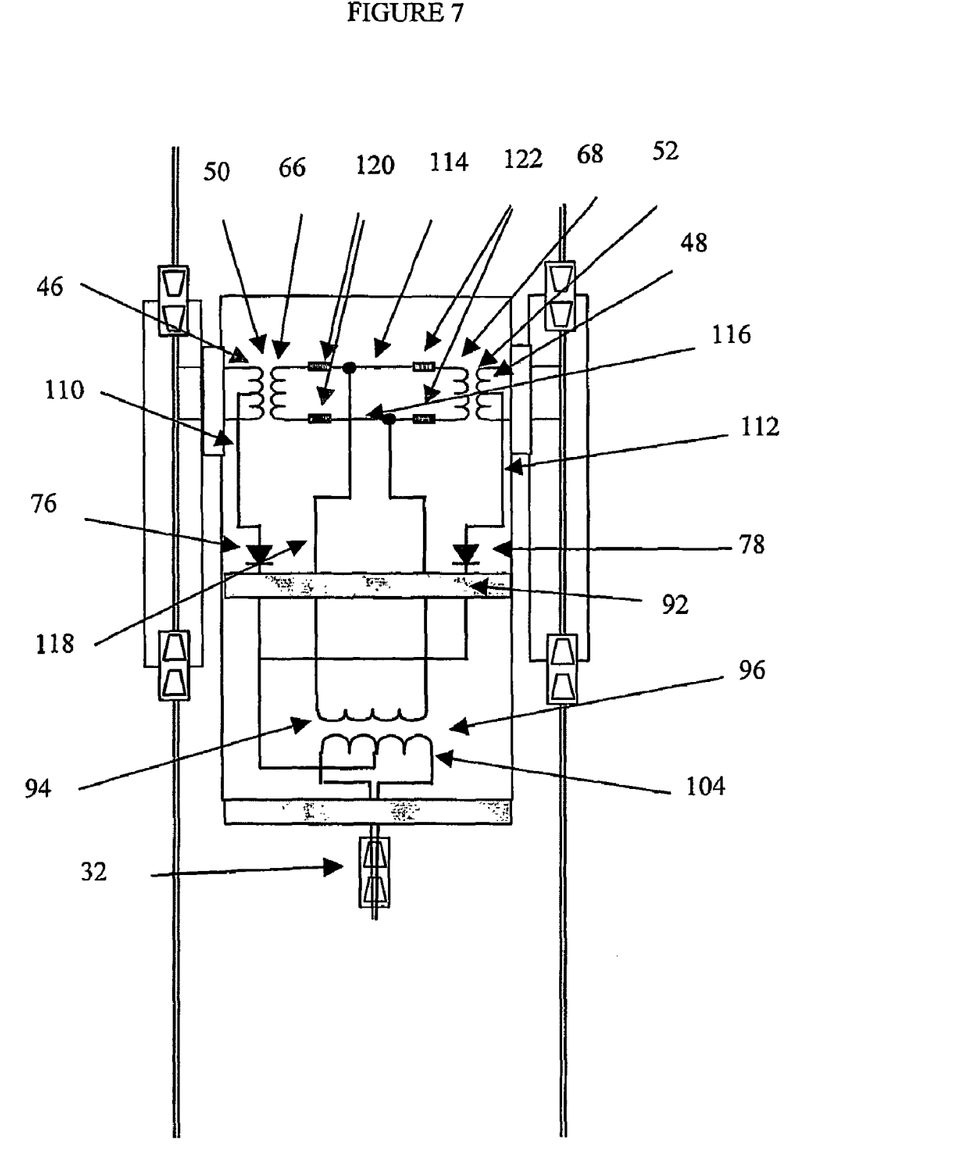
FIG. 7 shows a version of the sub according to the invention using only passive components.
Figure 8:
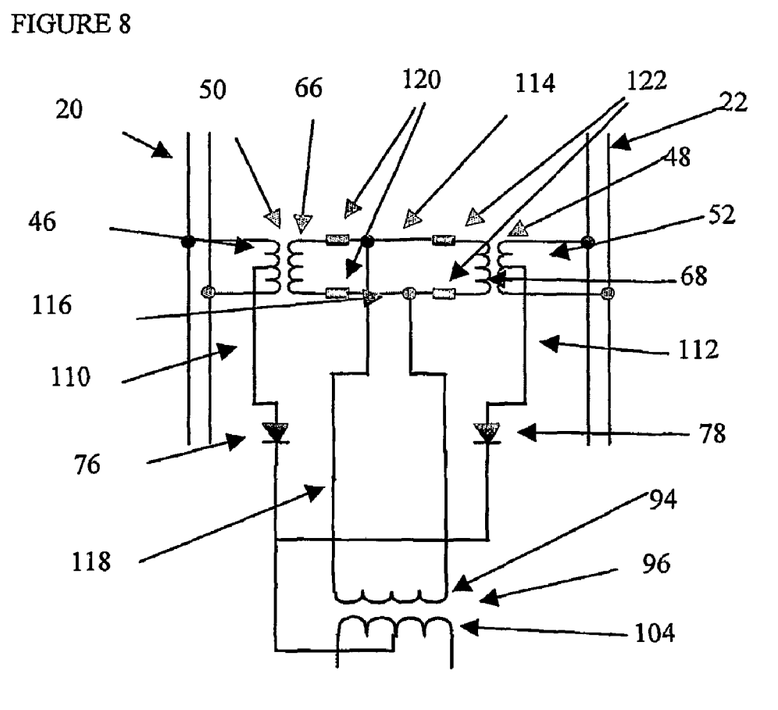
FIG. 8 shows the electrical circuit corresponding to the sub of FIG. 7.
Figure 9:
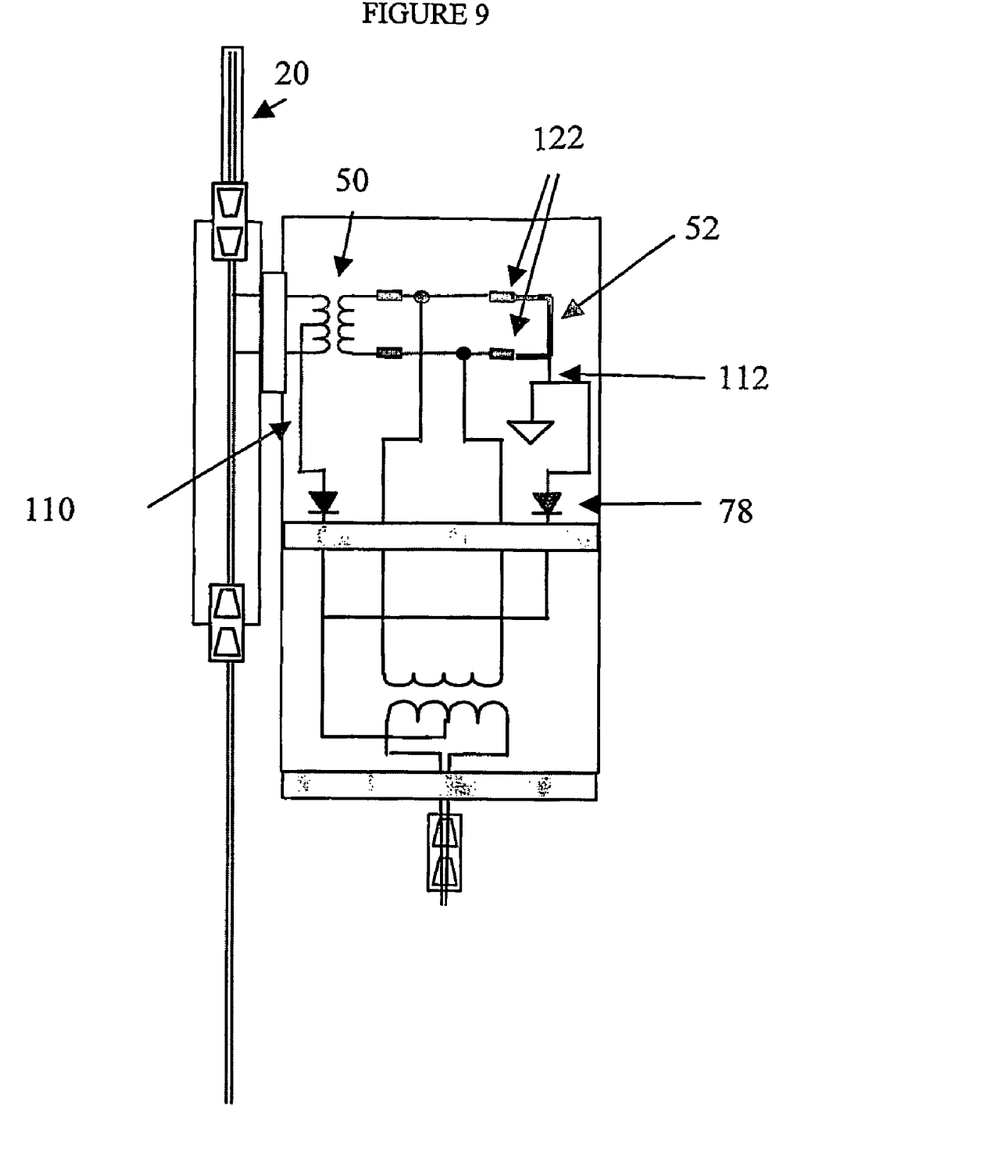
FIG. 9 shows an equivalent structure to the embodiment of FIG. 7 with a short on one of the cables.

FIG. 7 shows an embodiment of the invention that uses only passive components (FIG. 8 shown only the electric circuit of FIG. 7 with the structural component omitted for clarity). In this case, the circuit is similar to that of FIG. 5. The power supply feed is taken as a tap 110, 112 from the primary winding 46, 48 of the input transformer 50, 52, through the first bulkhead 92, to the secondary winding 104 of the intermediate transformer 96 (with diode protection 76, 78 on each channel) as before. The secondary windings 66, 68 of the input transformers 50, 52 are connected to each other 114, 116 and a feed 118 taken to the primary winding 94 of the intermediate transformer 96. Resistors 120, 122 are provided on either side of the feed take-off 118 so as to provide an impedance barrier. In the event of a change in the transformer characteristics for one channel, e.g. a cable failure, short circuit or the like, the impedance barrier means that the behaviour of the other input transformer is not substantially changed. As with the embodiments discussed above, only one cable is active at any given time. If a short circuit, or other failure, is detected in the active cable, the other cable is selected as before. FIG. 9 shows the effective configuration when a short circuit occurs in cable 22. In this case, cable 20 is active and power and data arrive at the tool via input transformer 50. The diode protection 78 on power channel 112 stops the channel 110 power supply charging that side of the circuit, and the resistors 122 on the side of input transformer 52 provide an impedance barrier so that the behaviour of the input transformer 50 is not modified. It is to be noted that the configuration of FIGS. 7, 8 and 9 comprises entirely passive components.

Figure 10:
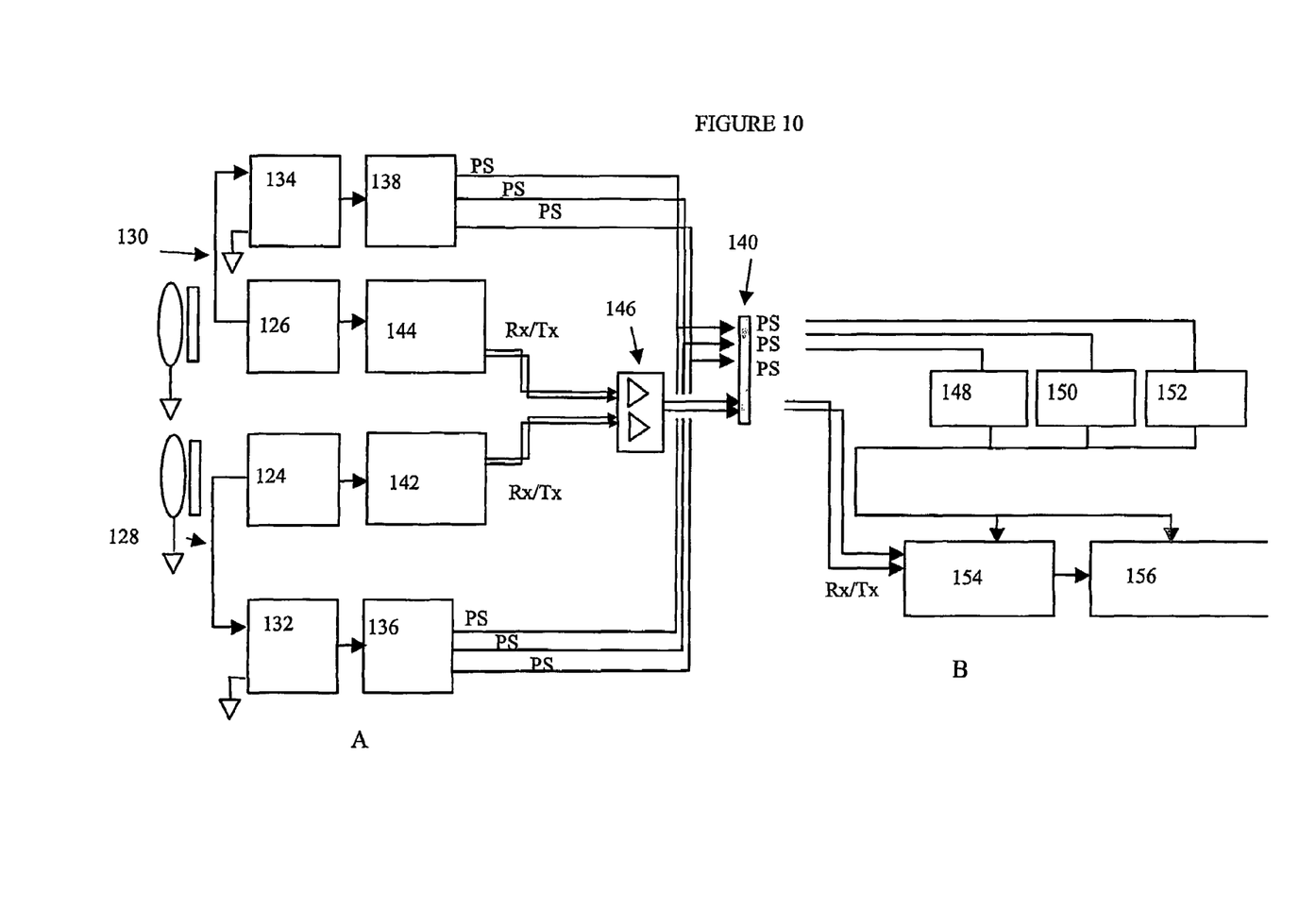
FIG. 10 shows a schematic view of a further embodiment of the present invention.

FIG. 10 shows a schematic view of further embodiment of the present invention, configured for use with a downhole electric control valve for managing the flow in the well. The figure shows the structure of a redundancy sub A and part of the tool electronics cartridge B. As before, the redundancy sub A essentially comprises two substantially identical power and data channels, one for each cable, the outputs of which are mixed prior to passing through the bulkhead to the tool electronics cartridge. Each channel comprises an input transformer 124, 126 as before. Again, the power take off 128, 130 is from the primary winding of the input transformer 124, 126, but in this case, since more than one power supply is needed by the tool for proper functioning, the power channel comprises a DC/AC converter 132, 134 and a step-down transformer 136, 138 which gives three output power supply channels PS0, PS1, PS2 which pass to the tool electronics cartridge B via the bulkhead 140 after the two channels are joined, with diode protection, as before. The number of power supply channels can be less or more than three.

The data channel is capable of handling both transmit and receive data streams. The secondary winding of the input transformer 124, 126 is connected to a Tx/Rx circuit including an electronics module (e.g. a WellNet module) 142, 144. The data channels from each cable are mixed at a Tx/Rx amplifier 146 and passed as a single feed to the tool electronics cartridge B, via the bulkhead 140, as before.

In the tool electronics cartridge B, each power channel PS0, PS1, PS2 is fed to a respective power regulator 148, 150, 152 and from there to an electronics module (e.g. WellNet module) 154 and motor controller 156 and thence on to the sensor and actuator parts of the tool (not shown). The data channel passes via the electronics module 154 to the motor controller 156 and sensors.

Figure 11:
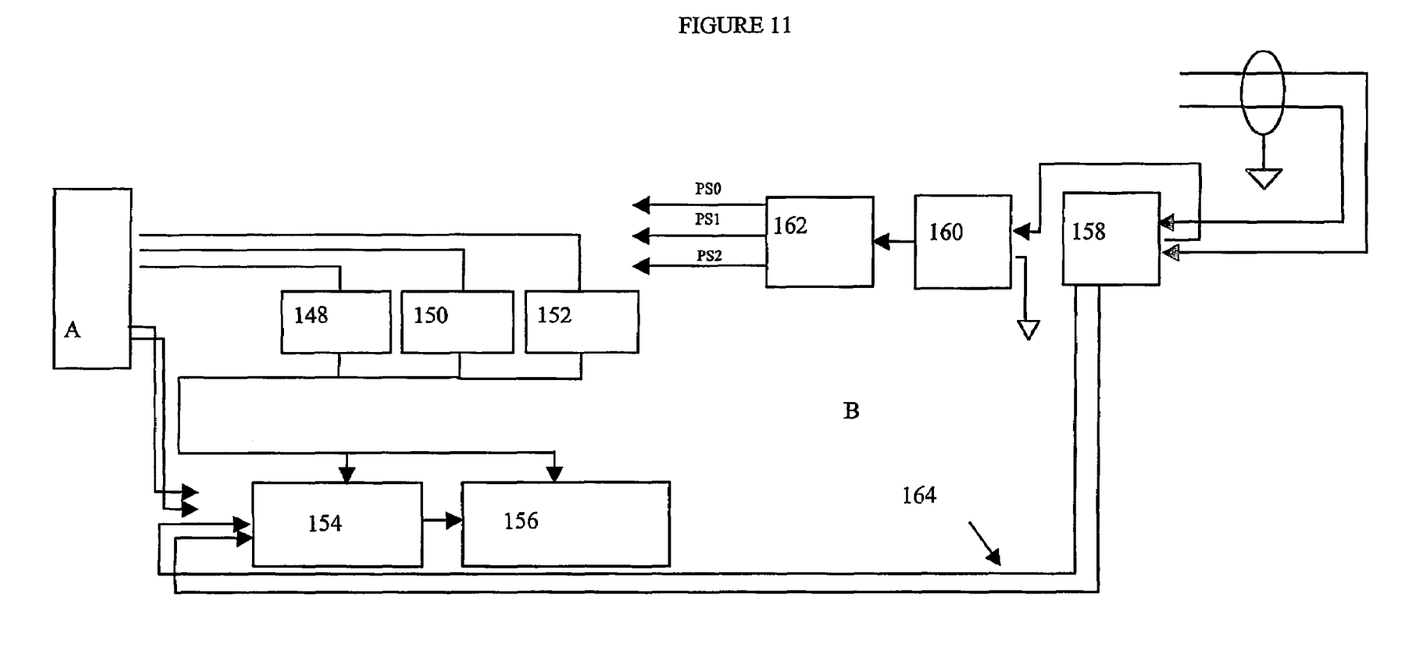
FIG. 11 shows further detail of the tool electronics cartridge shown in FIG. 10.

While the tool described here takes power and data via the redundancy sub A, the tool electronics cartridge B may also contain a conventional, single cable, power supply circuit as shown in FIG. 11. This comprises an input transformer 158, DC/AC converter 160 and step-down transformer 162. The data feed 164 is taken from the secondary winding of the input transformer 158 to the electronics module 154 of the cartridge, i.e. essentially the same structure as one channel of the redundancy sub A. This approach makes it unnecessary to have different tools for dual or single cable operation; in single cable operation, the tool is connected to the cable directly via the cartridge, in dual cable operation via the redundancy sub.

Figure 12:
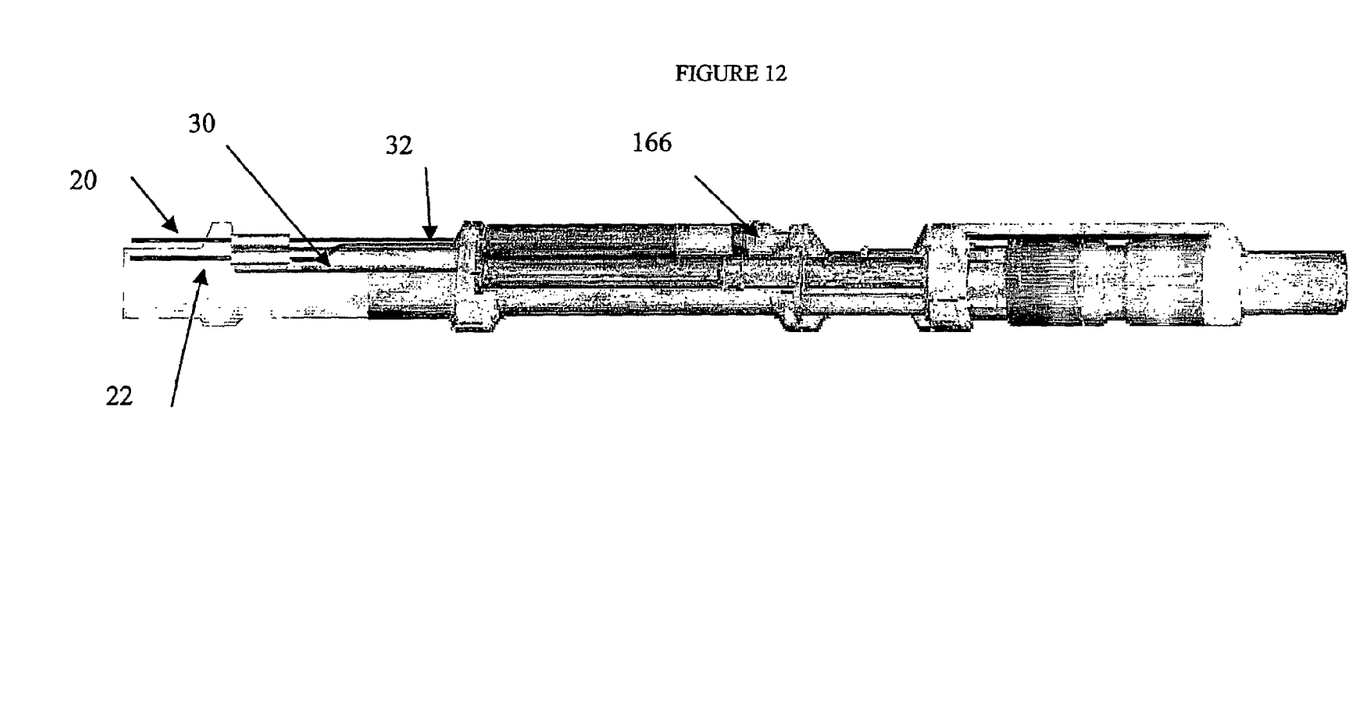
FIG. 12 shows an embodiment of the invention in the form of a flow control valve.
Figure 13:
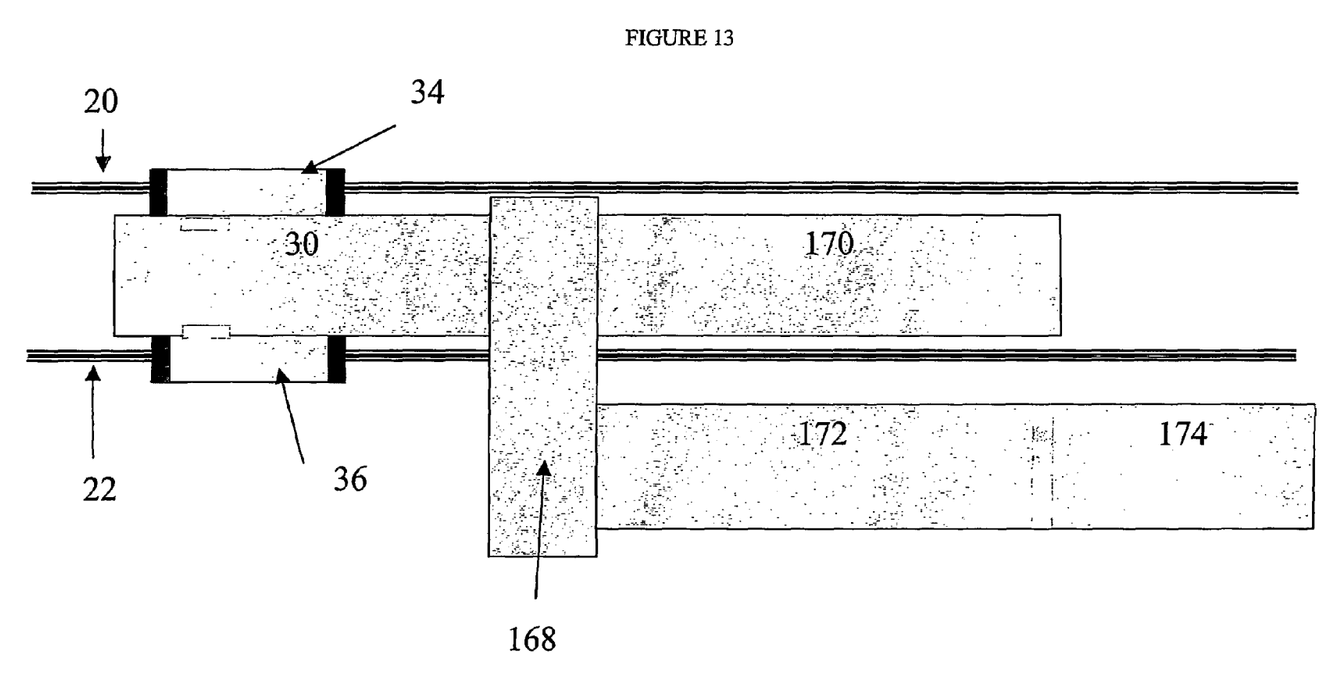
FIG. 13 shows the electrical system block diagram for the embodiment of FIG. 12.

The present invention can be implemented as part of a flow control installation utilising, for example, a variable flow control valve system such as the TRFC-E (Tubing Retrievable Flow Control-Electrical) of Schlumberger. FIG. 12 shows such an installation with two cables 20, 22, the redundancy sub 30, and the tool electronics cartridge 32 mounted on the valve assembly 160. A typical installation will comprise several of these valves in a well, possibly in conjunction with pressure gauges, flow meters or other measurement devices. While FIG. 12 shows the redundancy sub integrated with the flow control valve, it is also possible to implement the redundancy sub as a totally separate tool in its own right, which can be connected to any one of a number of permanently installed tools (e.g. WellNet tools). FIG. 13 shows schematically the electronic elements of the installation, comprising the cables 20, 22, cable connectors (one for each cable/channel) 34, 36 the redundancy sub 30, a connection box 168 incorporating the bulkhead described above and electronics sections for DC power regulation 170, interface and motor control 172, and the motor and actuator itself 174. The connection box architecture is described in U.S. Pat. No. 6,499,541.

Figure 14:
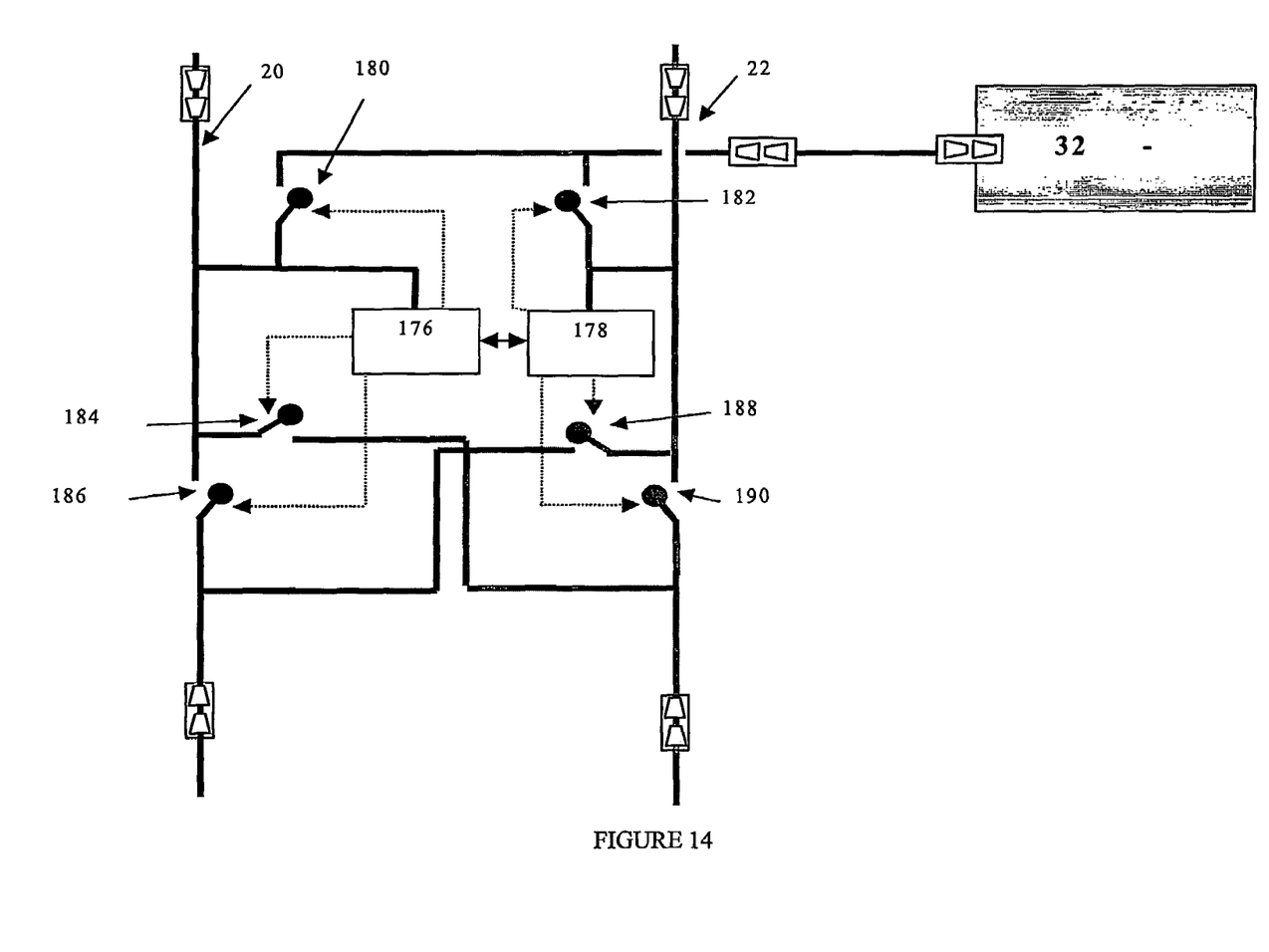
FIG. 14 shows an embodiment of the invention using active switching components.
Figure 15:
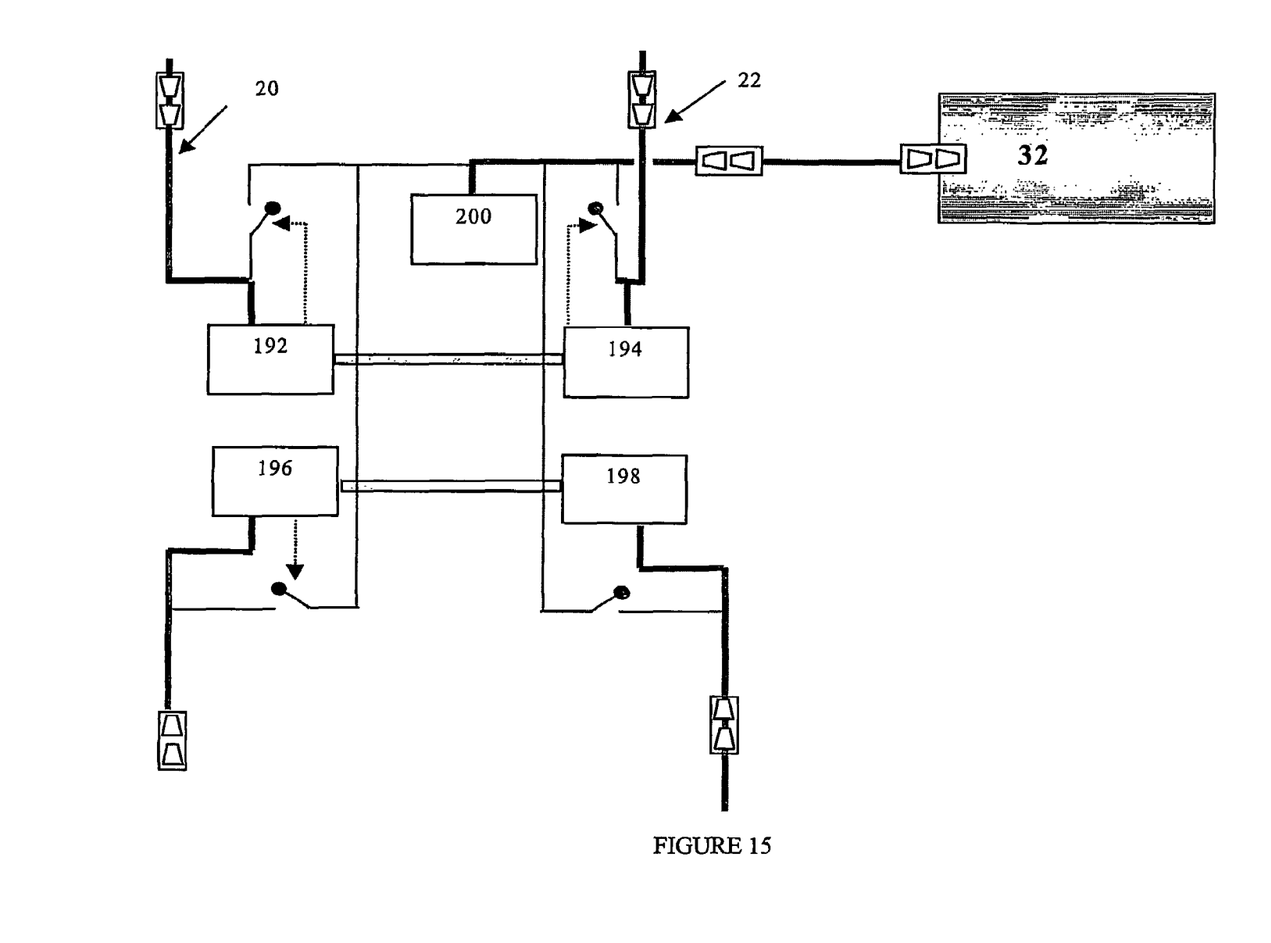
FIG. 15 shows a further embodiment of the invention using active switching components.

Two further embodiments of the invention are shown in FIGS. 14 and 15. These comprise full redundancy subs under active control downhole. By sending appropriate signals to the sub using the WellNet protocol, each can be configured to connect to one or other of the cables according to requirements. Consequently, it is possible to power both cables and have some tools connected to one cable and other tools to the other cable. Thus it is possible to isolate faults in both cable while retaining full functionality of the installation.

In the embodiment of FIG. 14, the redundancy sub contains two control modules (WellNet modules) 176, 178, one for each cable 20, 22. By sending an appropriate signal on a given cable, the relevant module operates switches 180, 182 to connect that cable to the tool 32, and instructs the other module to operate switches to disconnect its cable from the tool. The module can also operate other switches 184, 186 and 188, 190 to cross-connect the cables 20, 22 such that the power and data signals are transferred from one cable to the other below that sub. For example, if a fault is detected in cable 20 above the sub, the signal is sent on cable 22 for the module 178 to close the switch 182 to connect the tool 32 to cable 22, and to instruct the other module 176 to open the switch 180 to disconnect the tool 32 from cable 20. If it is also desired to continue operation on cable 20 below this tool, module 178 closes the switch 188 connecting cable 22 to cable 20 and opens the switch 190 for continued connection to the lower part of cable 22. Module 176 operates to open the switches 184, 186 to stop signals passing up cable 20 or to module 176.

The embodiment of FIG. 15 has one controller module 192, 194, 196, 198 for each switch function as well as a module 200 for the tool in question. Each module 192-200 has a network address and can be controlled from the surface via either cable using the appropriate protocol (WellNet).

By providing redundancy in the power and data channels for each tool in a manner that is easily controlled from the surface, the present invention allows improved reliability of the installation as a whole, with less susceptibility to total failure from cable problems or the like.

The invention claimed is:

1. Apparatus including a functional unit for installation in a well, comprising
    a first power supply channel and a first data channel connectable to a first cable in the well;
    a second power supply channel and a second data channel connectable to a second cable in the well; and
    at least two functional modules connected in parallel to said first cable and to said second cable wherein each functional module draws power from the first power supply channel or the second power supply channel, and data from the first data channel or the second data channel.

2. Apparatus as claimed in claim 1, wherein each functional unit is connected to the first and second cable via separate, isolated connectors, one on each cable.

3. Apparatus as claimed in claim 1, wherein the functional units are operably connected to the cables via respective input transformers.

4. Apparatus as claimed in claim 3, wherein each power supply channel is taken from a primary winding of the corresponding input transformer.

5. Apparatus as claimed in claim 3, wherein each data channel is taken from a secondary winding of the corresponding input transformer.

6. Apparatus as claimed in claim 1, wherein the outputs of the power supply channels are combined to provide a single power input for the functional module.

7. Apparatus as claimed in claim 6, wherein diodes are provided in each channel to prevent power from an active channel affecting an inactive channel.

8. Apparatus as claimed in claim 6, wherein a fuse is included in each power supply channel to allow permanent disabling of a channel in the case of a fault.

9. Apparatus as claimed in claim 1, wherein an intermediate transformer is provided between the power and data channels and the functional module.

10. Apparatus as claimed in claim 9, wherein the power input is provided to a tap in a secondary winding of the intermediate transformer.

11. Apparatus as claimed in claim 1, wherein the power supply channels are configured to provide multiple power signals.

12. Apparatus as claimed in claim 11, wherein the power supply channels comprise DC/AC converters and step-down transformers with multiple outputs.

13. Apparatus as claimed in claim 1, wherein each data channel is taken from a secondary winding of a corresponding input transformer.

14. Apparatus as claimed in claim 13, wherein the secondary windings of the input transformers are connected to each other.

15. Apparatus as claimed in claim 14, wherein the data channel is taken from a common connection to the connection between the secondary windings.

16. Apparatus as claimed in claim 15, further comprising resistors in the common connection at each transformer to provide an impedance barrier such that one channel does not affect the behaviour of the other channel due to the common connection.

17. Apparatus as claimed in claim 1, wherein the data channels comprise transmitter/receiver electronics modules to allow two-way data communication.

18. Apparatus as claimed in claim 1, comprising only passive components in the data and power supply channels.

19. Apparatus as claimed in claim 1, comprising switch devices in each channel, each switch device including one or more active components.

20. Apparatus as claimed in claim 1, wherein the functional module includes power regulator and controllers for the or each power input.

21. Apparatus as claimed in claim 1, wherein the functional module includes data communication modules with transmit and receive functionality.

22. Apparatus as claimed in claim 1, wherein the functional module includes sensor and/or actuator functions.

23. Apparatus as claimed in claim 1, wherein the functional module includes its own power supply channel to allow direct connection to a single cable for power and data.

24. Apparatus as claimed claim 1, wherein outputs of the data channels are combined to provide a single data input for the functional module.

25. Apparatus as claimed in claim 1, wherein the output of the data channels is provided to the functional module via a primary winding of an intermediate transformer.

26. A well instrumentation system including an apparatus as claimed in claim 1, comprising:
    a power and data supply; and
    a plurality of functional units attached to the power and data supply and distributed throughout the well, characterised in that the power and data supply comprises first and second substantially identical cables, and in that each unit comprises a first power supply channel and a first data channel connected to the first cable, a second power supply channel and a second data channel connected to the second cable, and a functional module which draws power from the first power supply channel or the second power channel module, and data from the first data channel or the second data channel.

27. Apparatus as claimed in claim 1, wherein the power and data supplies comprise a surface unit that can be selectably connected to either the first or second cable, the selection of connection of the surface unit to one or other cable being effective to select the corresponding power and data channels in the functional units.

* * * * *